(12) United States Patent
Brison et al.

(10) Patent No.: US 7,851,585 B2
(45) Date of Patent: Dec. 14, 2010

(54) POLYACETAL COMPOSITIONS WITH IMPROVED TRIBOLOGICAL PROPERTIES

(75) Inventors: Anne-Laure Brison, Senlis (FR); Andreas Renken, Geneva (CH)

(73) Assignee: E. I. du Pont de Nemours and Company, Wilimington, DE (US)

( * ) Notice: Subject to any disclaimer, the term of this patent is extended or adjusted under 35 U.S.C. 154(b) by 0 days.

(21) Appl. No.: 12/288,036

(22) Filed: Oct. 16, 2008

(65) Prior Publication Data

US 2009/0105426 A1    Apr. 23, 2009

Related U.S. Application Data

(60) Provisional application No. 60/999,563, filed on Oct. 19, 2007.

(51) Int. Cl.
*C08F 6/00* (2006.01)
*C08G 63/00* (2006.01)

(52) U.S. Cl. .............. 528/502 R; 264/176.1; 264/219; 264/483; 384/276; 384/279; 384/448; 384/454; 524/100; 524/189; 524/261; 525/400; 525/402; 525/405; 528/250; 528/271; 528/272; 528/472; 528/480; 528/481

(58) Field of Classification Search ............. 264/176.1, 264/219, 483; 384/276, 279, 448, 454; 524/100, 524/189, 261; 525/400, 402, 405; 528/250, 528/271, 272, 472, 480, 481
See application file for complete search history.

(56) References Cited

U.S. PATENT DOCUMENTS

| 2,952,656 | A | * | 9/1960 | Zomlefer | ............ 524/584 |
| 4,308,374 | A |   | 12/1981 | Vollbracht | |
| 5,474,842 | A |   | 12/1995 | Hoiness | |
| 5,482,987 | A |   | 1/1996 | Forschirm | |
| 5,523,352 | A |   | 6/1996 | Janssen | |
| 5,811,042 | A |   | 9/1998 | Hoiness | |
| 5,824,742 | A |   | 10/1998 | Shinohara | |
| 6,284,828 | B1 |   | 9/2001 | Takayama | |
| 6,545,075 | B2 | * | 4/2003 | Nishihata et al. | ............ 524/261 |
| 7,098,262 | B2 |   | 8/2006 | Kim | |
| 2006/0116486 | A1 |   | 6/2006 | Monma | |
| 2007/0032605 | A1 | * | 2/2007 | Harashina | ............ 525/400 |

FOREIGN PATENT DOCUMENTS

| JP | 06240103 | * | 8/1994 |
| JP | 08245857 | * | 9/1996 |

* cited by examiner

*Primary Examiner*—Terressa M Boykin
(74) *Attorney, Agent, or Firm*—Loretta Smith; Otha Weaver; Arne Jarnholm

(57) ABSTRACT

The invention relates to polyacetal compositions comprising a mixture of (i) a polyacetal resin, (ii) p-aramid particles and (III) a vinyl-terminated dimethyl siloxane polymer. These compositions are useful in preparing molded articles exhibiting a good balance between high self-lubricating properties and wear resistance, and especially useful in articles that are in motion with respect to other parts they are in contact with.

8 Claims, 1 Drawing Sheet

POLYACETAL COMPOSITIONS WITH IMPROVED TRIBOLOGICAL PROPERTIES

CROSS REFERENCE TO RELATED APPLICATIONS

This application claims the benefit of U.S. Provisional Application No. 60/999,563, filed Oct. 19, 2009, which is incorporated herein by reference in its entirety.

FIELD OF THE INVENTION

The present invention relates to the field of polyacetal compositions and molded products thereof, which exhibit excellent self-lubricating properties and wear resistance.

DESCRIPTION OF THE RELATED ART

Polyacetal (also called polyoxymethylene, POM) resins exhibit excellent mechanical and physical properties, such as tensile strength, stiffness, as well as fatigue resistance, lubrication resistance, chemical resistance, moldability and the like. These resins are extensively used in various applications as an engineering plastic material such as for example in the automotive, domestic appliance, installation, machinery, tool, electronics and consumer goods industries. In addition to their excellent mechanical and physical properties, polyacetal resins are known to exhibit good self-lubricating properties and wear resistance and have been used for applications when parts are in motion with respect to other parts they are in physical contact with.

U.S. Pat. No. 5,824,742, discloses a polyacetal resin composition comprising an olefinic polymer having glycidyl-group containing pendant chains and a dimethyl siloxane polymer. Such compositions are said to have excellent resistance to heat aging and to grease while having improved friction characteristics.

U.S. Pat. No. 5,482,987, discloses a self-lubricating composition comprising a thermoplastic polymer such as for example a polyacetal and a lubricating system. The lubricating system contains high and low molecular weight polyethylenes, polyethylene waxes, metal salts, antioxidants and stabilizers.

U.S. Pat. No. 7,098,262, discloses a polyacetal composition comprising an antioxidant, a thermal stabilizer, a polyethylene vinylacetate copolymer and a hydroxyl pentaerythritol fatty acid ester. Such compositions are said to have excellent wear resistance and abruption-preventing effect.

U.S. Pat. No. 6,284,828, discloses a polyacetal resin composition comprising a mixture of polyacetal resin, a modified olefinic polymer, an alkylene glycol polymer and an inorganic filler. Such compositions are said to be excellent in self-lubrication and abrasion resistance especially against inorganic filler blended materials by improving the compatibility, dispersibility and interfacial adhesion between resins.

US Patent Application 2006/0116486, now abandoned, discloses a polyacetal resin composition comprising a mixture of a polyacetal resin having substantially straight chain molecular structure, a polyacetal resin having branched or crosslinked molecular structure and a lubricant oil keeping liquid state at 200° C. Such compositions are said to have self-lubrication and abrasion characteristics and improved mechanical strength.

http://www.hbmedia.net/petplanet/petplanet/insider/2002/04/articles/bottlemaking3.shtml discloses a high performance polyacetal resin modified with Kevlar® which exhibits good self-lubricating properties and wear resistance.

U.S. Pat. No. 5,523,352, discloses a polyacetal resin composition comprising a low density polyethylene and aramid powder. Such compositions are said to have good self-lubricating, wear and melt flow properties.

A need remains for polyacetal compositions exhibiting improved tribological properties so that they can be used in articles that are in motion with respect to other parts they are in contact with.

SUMMARY OF THE INVENTION

It has been surprisingly found that polyacetal compositions comprising (i) a polyacetal resin, (ii) p-aramid particles and (III) a vinyl-terminated dimethyl siloxane polymer show improved tribological properties.

The combination of p-aramid particles and vinyl-terminated dimethyl siloxane polymer confers to the composition a low coefficient of friction and low wear if compared with polyacetal compositions of the state of the art.

In a second aspect, the invention provides a method of manufacturing polyacetal polymer compositions having improved tribological properties.

In a third aspect, the invention provides a molded article made of the polyacetal composition of the invention.

DETAILED DESCRIPTION OF THE INVENTION

Figure 1:
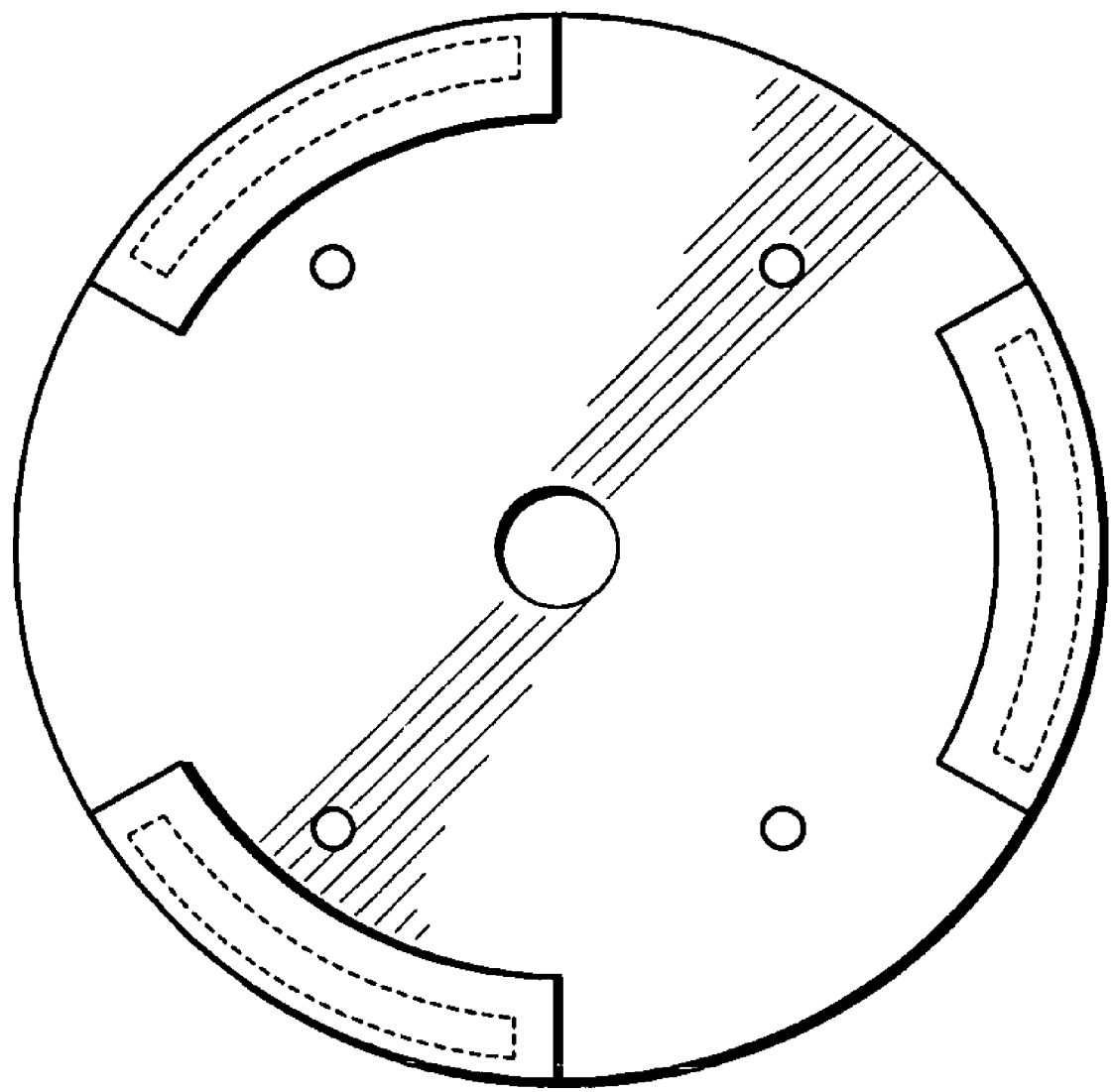
FIG. 1 is a schematic representation of a dynamic part which has been molded from the polyacetal compositions and has been used to measure the coefficient of friction.

Tribology is the science and technology of interactive surfaces in relative motion and by "tribological properties"; it is meant a combination of self-lubricating properties and wear resistance.

The polyacetal resin used herein includes homopolymers of formaldehyde or of cyclic oligomers (e.g. trioxane and tetraoxane) of formaldehyde, the terminal groups of which are end-capped by esterification or etherification, copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification, or a mixture of such homopolymers and copolymers. End-capping is generally done to prevent the polyacetal from "unzipping" as it tends to do at elevated temperatures. Acetal copolymers contain at least one comonomer. Comonomers commonly used in preparing acetal copolymers include alkylene oxides of 2-12 carbon atoms and their cyclic addition products with formaldehyde. The quantity of comonomer is generally not more than about 20 wt-%, preferably not more than about 15 wt-%, and most preferably about 2 wt-%, the weight percentage being based on the total weight of the polyacetal resin. The most preferred comonomer is ethylene oxide. The preferred acetal homopolymers include those whose terminal hydroxyl groups have been end-capped by a chemical reaction to form ester or ether groups, preferably acetate or methoxy groups, respectively.

The polyacetal resin used in the polyacetal compositions according to the present invention may be branched or linear. It generally has a number of average molecular weight in the range of about 10,000 to 100,000, preferably about 20,000 to 75,000. These polyacetal molecular weights are generally preferred in order to provide an optimum balance of good mixing of the various ingredients to be melt blended into the composition with the most desired combination of physical properties in the molded articles made from the such compositions; however, polyacetals having higher or lower molecular weight averages may be used, depending on the physical and processing properties desired. The molecular weight of the polyacetal may conveniently be measured by gel permeation chromatography in m-cresol at 160° C. using a DuPont PSM bimodal column kit with nominal pore size of 60 and 1,000 angstroms.

The polyacetal resin is preferably present from at or about 75 wt-% to at or about 98 wt-%, more preferably from at or about 75 wt-% to at or about 95 wt-% and still more preferably in about from at or about 80 wt-% to at or about 95 wt-% the weight percentages being based on the total weight of the polyacetal composition.

Suitable polyacetal resins for the present invention are commercially available from E. I. du Pont de Nemours and Company, Wilmington, Del. under the trademark Delrin®.

The polyacetal composition according to the present invention comprises p-aramid particles, preferably from at or about 1 wt-% to at or about 20 wt-% and more preferably from at or about 1 wt-% to at or about 15 wt-%, the weight percentages being based on the total weight of the polyacetal composition. By "aramid", it is meant a polyamide wherein at least 85% of the amide (—CO—NH—) linkages are attached directly to two aromatic rings and by "p-aramid", it is meant that the amide linkages are attached to the aromatic rings opposite to each other, at carbons 1 and 4 (i.e. in a para substitution). P-aramid particles used in the polyacetal composition according to the present invention are intended to refer to wholly aromatic polycarbonamide polymers and copolymers consisting essentially of recurring units of the formula (I)

—NH—Ar$_1$—NH—CO—Ar$_2$—  (I)

wherein Ar$_1$ and Ar$_2$ which may be the same or different, represent divalent aromatic groups. Preferably, p-aramid particles are poly(p-phenyleneterephthalamide) (also known as PPD-T) particles. By PPD-T, it is meant homopolymers resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride.

P-aramid particles for use in the present invention have an average largest dimension that does not exceed 500 μm, preferably does not exceed 200 μm, and more preferably does not exceed 150 μm. By "average largest dimension", it is meant that the particle size is such that at least 90 wt-%, more preferably 95 wt-% of the particles passes through a 150 μm screen when tested according to ISO 1410. The p-aramid particles used in the present invention are not limited to any particular shape; they may be for example short fibers, fibrils, fibrids, irregular, spherical, disc shaped, and the like. The longest dimension for example of a fiber, fibril or fibrid will normally be its length.

By the expression "p-aramid particles", it is meant particles, as defined above, made of p-aramid polymer (resin) that has never been spun into filaments, e.g. by dissolving in sulfuric acid and spinning. The expression excludes aramids in the form of spun filaments or products made therefrom, woven or nonwoven fabrics or aramid papers, even though the "particles" of aramid in any of these types of materials meet the size limitations described above. Indeed, p-aramid fibers (i.e. after spinning) strongly accelerate the degradation of polyacetal resin homopolymers due to chemical residues such as sulfuric acid from the fibre spinning process.

In opposition to p-aramid filaments, p-aramid particles are unorientated (as can be seen with an optical microscope) and do not contain such chemical residues. Preferably, the p-aramid particle used in the polyacetal composition of the present invention is a "powder" grade. Such grades contain particles which for the most part are not fiber-like or fibrillar-like. The p-aramid powder usually has a surface area of 2 m$^2$/g or less, often 0.2 m$^2$/g or less and may be prepared by grinding the p-aramid, see for instance U.S. Pat. Nos. 5,474,842, 5,811, 042, and Research Disclosure, May 1996, p. 293.

P-aramid particles are made by comminuting unspur aramid polymer to the desired size. For example, p-aramid polymer made in accordance with the teachings in U.S. Pat. Nos. 3,063,966 and 4,308,374 is finished in the form of a water-wet crumb which, for purposes of this invention, can be dried and then pulverized in a hammer mill to a desired average diameter up to 500 μm. Once dried and pulverized, the p-aramid particles can be classified and particles of the desired size range can be isolated for use.

Suitable p-aramid particles for the present invention are commercially available from E. I. du Pont de Nemours and Company, Wilmington, Del. under the trademark Kevlar®.

The polyacetal composition according to the present invention comprises a vinyl-terminated dimethyl siloxane polymer. Preferably, the vinyl-terminated dimethyl siloxane polymer used in the polyacetal composition according to the present invention has a viscosity from at or about 150 CST to at or about 10,000 CST at 25° C., and preferably in the from at of about 200 to at about 4,000 CST.

Preferably, the vinyl-terminated dimethyl siloxane polymer is present in an amount from at or about 0.5 wt-% to at or about 5 wt-% and more preferably from at or about 1 wt-% to at or about 4 wt-%, the weight percentage being based on the total weight of the polyacetal composition. If the amount of the vinyl-terminated dimethyl siloxane polymer is too low, no satisfactory improvement is obtained on the resistance to wearing; while if the amount is too high, it not only adversely affects the moldability but it also decreases the resistance to wearing.

Optionally, the polyacetal compositions of the invention may include additives which are generally comprised in thermoplastic resin compositions.

The polyacetal compositions according to the present invention may optionally contain one or more heat stabilizing agents. Heat stabilizing agents as their name implies serve to stabilize the compositions of this invention at elevated temperatures, e.g. molding temperatures, extruding temperatures and the like. Preferably such agents are polyacrylamides and ethylene vinyl alcohol (EVOH). When comprised in the polyacetal composition of the present invention, the one or more heat stabilizing agents are preferably present in an amount between at or about 0.05 wt-% to at or about 1.50 wt-%, and more preferably from at or about 0.20 wt-% to at or about 1.00 wt-%, the weight percentage being based on the total weight of the polyacetal composition.

The polyacetal compositions according to the present invention may optionally contain one or more oxidative stabilizers (antioxidants). Examples of suitable oxidative stabilizers include hindered phenol stabilizers. When comprised in the polyacetal composition of the present invention, the one or more oxidative stabilizers are preferably present in an amount between at or about 0.05 wt-% to at or about 1 wt-%, the weight percentage being based on the total weight of the polyacetal composition.

The polyacetal composition according to the present invention may further include modifiers and other ingredients, including, without limitation, lubricants, UV light stabilizers, antistatic agents, coloring agents, flame retardants, nucleating agents, crystallization promoting agents and other processing aids known in the polymer compounding art.

In another aspect, the present invention relates to a method of manufacturing the polyacetal polymer compositions described above. Such method comprises the step of mixing the polyacetal resin, p-aramid particles and the vinyl-terminated dimethyl siloxane polymer.

The compositions are melt-mixed blends, wherein all of the polymeric components are well-dispersed within each other and all of the non-polymeric ingredients are well-dispersed in and bound by the polymer matrix, such that the blend forms a unified whole. Any melt-mixing method may be used to combine the polymeric components and non-polymeric ingredients of the present invention. For example, the polymeric components and non-polymeric ingredients may be added to a melt mixer, such as, for example, a single or twin-screw extruder; a blender; a single or twin-screw kneader; or a Banbury mixer, either all at once through a single step addition, or in a stepwise fashion, and then melt-mixed. When adding the polymeric components and non-polymeric ingredients in a stepwise fashion, part of the polymeric components and/or non-polymeric ingredients are first added and melt-mixed with the remaining polymeric components and non-polymeric ingredients being subsequently added and further melt-mixed until a well-mixed composition is obtained.

In another aspect, the present invention relates to an article made with the polyacetal composition of the invention. The article according to the present invention may be produced by any methods known to one of ordinary skill in the art such as for example extrusion, injection molding, compression molding, blow molding, thermoforming, rotational molding and melt casting. Example of articles include bearings, gears, cams, rollers, sliding plates, pulleys, levers, guides, conveyor system components such as wear strips, guard rails and conveyor belt parts.

The invention will be further described in the Examples below.

EXAMPLES

The following materials were used for preparing the polyacetal compositions according to the present invention and comparative ones.

Polyacetal resin: heat stabilized (ethylene vinyl alcohol copolymer, 0.08 wt-% and polyacrylamide, 0.48 wt-%) polyacetal homopolymer having a number average molecular weight of about 60,000 comprising antioxidants (ethylene bis(oxyethylene) bis-(3-(5-tert-butyl-4-hydroxy-m-tolyl)-propionate), 0.07 wt-% and N,N'-hexane-1,6-diylbis(3-(3,5-di-tert-butyl-4-hydroxyphenylpropionamide)), 0.03 wt-%) and talc (0.15 wt-%).

P-aramid particles: poly(p-phenyleneterephthalamide) particles (never spun) having a particle size less than 125 μm supplied by E.I. DuPont de Nemours & Co., Inc., Wilmington, Del. 19898, USA, under the trademark Kevlar®.

Vinyl-terminated PDMS: vinyl-terminated dimethyl siloxane polymer having a viscosity of 1000 CST at 25° C. supplied by Emerald Foam Control LLC, Cheyenne, Wyo. 82007, USA, under the trademark Masil® SF201.

Polyacetal compositions according to the present invention and comparative ones are given in Table 1

Compounding and Molding Methods "Side fed" means those ingredients were mixed and fed in the side of the extruder, while "rear fed" means those ingredients were mixed and fed into the rear of the extruder. The mixing of the ingredients was usually by tumble mixing.

Compounding Method Polymeric compositions were prepared by compounding in a 40 mm Berstorf twin screw extruder. The polyacetal polymer pellets were added to the rear (barrel 1) of the extruder, the p-aramid particles were side fed into Barrel 5 and the vinyl-terminated PDMS was added using a liquid injection pump into the front (Barrel 10). Any exceptions to this method are noted in the examples. Barrel temperatures were set at 190-200° C. resulting in melt temperatures not exceeding 250° C. depending on the composition and extruder rate and rpm of the screw.

Resins were molded into test specimens on a 175 ton injection molding machine. Barrel temperatures were 190-200° C., melt temperatures were 215 +/−5° C., mold temperatures were 90° C. to 120° C., depending on mold used.

All materials were molded using the standard injection molding procedure and tested according to the following description. Results are summarized in Table 1.

Taber Test: The Taber abrasion tests were done according to ASTM D1044 on a Teledyne-Taber Abraser Model 503 from Taber Industries, North Tonawanda, N.Y. 14120 using abrasive wheels calibrate H-8 and a 1 kg load for 25000 cycles. The polymer samples for these tests were 100×100×5 mm plates molded according to the previously described method. The results expressed as weight loss in grams are given in Table 1.

Coefficient of Friction (COF): The coefficients friction of the polyacetal compositions against PET were measured on a Plint TE92 thrust washer machine from Phoenix Tribology Ltd, Basingstoke, N.H., RG21 7PW, UK. The test method was adapted from ASTM D3702 whereby the static sample was an amorphous PET molded disc with a diameter of 69 mm. The rotating dynamic part was molded from the polyacetal compositions to be evaluated and the part dimensions are illustrated in FIG. 1. Tests were done at room temperature using a 40N normal load at a rotating speed of 175 rpm. Coefficient of friction was determined after a 3 hour run-in period. Results are given in Table 1.

TABLE 1

|  | Example | | | |
| --- | --- | --- | --- | --- |
|  | C1 | C2 | C3 | E1 |
| polyacetal composition/wt-% | 100 | 98 | 95 | 93 |
| p-aramid particles/wt-% |  |  | 5 | 5 |
| vinyl-PDMS/wt-% |  | 2 |  | 2 |
| COF at 3 hours | 0.32 | 0.18 | 0.39 | 0.17 |
| taber weight loss/g | 0.46 | NA | 0.28 | 0.31 |

NA means not available

As shown in Table 1, the polyacetal composition according to the present invention which comprised p-aramid particles and vinyl-terminated PDMS exhibit a good balance between high self-lubricating properties and wear resistance if compared with examples (C1-C3).

What is claimed is:

1. A polyacetal composition comprising:
    i. 75 wt-% to 98 wt-% of a polyacetal resin;
    ii. 1 wt-% to 20 wt-% of p-aramid particles having an average largest dimension that does not exceed 500 μm; and iii. 0.5 wt-% to 5 wt-% of a vinyl-terminated dimethyl siloxane polymer having a viscosity from 150 CST to 10,000 CST at 25° C.;

with the proviso that the p-aramid particles of (ii) excludes aramids in the form of spun filaments, woven or nonwoven fabrics, or aramid papers.

2. The polyacetal composition of claim 1, wherein the p-aramid particles have an average largest dimension that does not exceed 150 μm.

3. The polyacetal composition of claim 1, wherein the p-aramid particles are poly(p-phenylene terephthalamide) particles.

4. A method of manufacturing a polyacetal polymer composition, comprising the step of mixing (i) 75 wt-% to 98 wt-% of a polyacetal resin;

(ii) 1 wt-% to 20 wt-% of p-aramid particles having an average largest dimension that does not exceed 500 μm; and (iii) 0.5 wt-% to 5 wt-% of a vinyl-terminated dimethyl siloxane polymer having a viscosity from 150 CST to 10,000 CST at 25° C.;

with the proviso that the p-aramid particles of (ii) excludes aramids in the form of spun filaments, woven or nonwoven fabrics, or aramid papers to provide the polyacetal polymer composition.

5. A molded article formed from the polyacetal composition described in claims 1, 2, or 3.

6. The molded article according to claim 5, which is a bearing, gear, cam, roller, sliding plats, pulley, lever, guide or a conveyor system component.

7. The molded article according to claim 6, which is a conveyor system component.

8. A polyacetal composition comprising:

i. 75 wt-% to 98 wt-% of a polyacetal resin;

ii. 1 wt-% to 20 wt-% of p-aramid particles having an average largest dimension that does not exceed 500 μm; and iii. 0.5 wt-% to 5 wt-% of a vinyl-terminated dimethyl siloxane polymer having a viscosity from 150 CST to 10,000 CST at 25° C.;

with the proviso that the p-aramid particles of (ii) are in powder form and which have never been spun into filaments or fibers.

* * * * *